(12) United States Patent
Jang et al.

(10) Patent No.: US 7,904,842 B1
(45) Date of Patent: Mar. 8, 2011

(54) MODIFYING A LOGIC IMPLEMENTATION BY SWAPPING INPUTS OF FANOUT-FREE CONES

(75) Inventors: Tetse Jang, San Jose, CA (US); Vi Chi Chan, Shatin N. T. (HK); Kevin Chung, Toronto (CA)

(73) Assignee: Xilinx, Inc., San Jose, CA (US)

( * ) Notice: Subject to any disclaimer, the term of this patent is extended or adjusted under 35 U.S.C. 154(b) by 504 days.

(21) Appl. No.: 12/006,985

(22) Filed: Jan. 8, 2008

(51) Int. Cl.
*G06F 17/50* (2006.01)
(52) U.S. Cl. .............. 716/3; 716/1; 716/2; 716/4; 716/5; 716/6
(58) Field of Classification Search .................. 716/1–6; 703/2, 13–14
See application file for complete search history.

(56) References Cited

U.S. PATENT DOCUMENTS

| | | | | |
|---|---|---|---|---|
| 6,473,885 | B1 * | 10/2002 | Wallace | 716/4 |
| 7,299,444 | B1 * | 11/2007 | Tai et al. | 716/16 |
| 7,350,176 | B1 * | 3/2008 | Baeckler et al. | 716/16 |

OTHER PUBLICATIONS

David Dye; "Physical Synthesis and Optimization with ISE 9.1i"; White Paper: Virtex and Spartan FPGAs; WP230 (v1.1); May 16, 2007; pp. 1-9.
Deshanand P. Singh et al.; "Two-Stage Physical Synthesis for FPGAs"; IEEE 2005 Custom Integrated Circuits Conference; Copyright 2005 IEEE; pp. 171-178.
Daniel Brand; "Verification of Large Synthesized Designs"; ICCAD; Nov. 1993; Copyright 1993 IEEE; pp. 534-537.
Alan Mishchenko et al.; "Improvements to Combinational Equivalence Checking"; Proceedings ICCAD '06; Nov. 5-9, 2006; Copyright 2006 ACM; pp. 836-843.
Alan Mishchenko et al.; "SAT-Based Complete Don't-Care Computation for Network Optimization"; Proceedings of the Design, Automation and Test in Europe Conference and Exhibition (Date '05); pp. 418-423.
Jin S. Zhang et al.; "Symmetry Detection for Large Boolean Functions Using Circuit Representation, Simulation, and Satisfiability"; 43rd ACM/IEEE Design Automation Conference; Jul. 24-28, 2006; Copyright 2006 ACM; pp. 510-515.
Berkeley Logic Synthesis and Verification Group; "ABC: A System for Sequential Synthesis and Verification", downloaded on Dec. 20, 2007 from http://www.eecs.berkeley.edu/~alanmi/abc/abc/htm; pp. 1-20.
MVSIS Group; MVSIS: Multi-Valued Logic Synthesis System; downloaded on Dec. 20, 2007 from http://embedded.eecs.berkeley.edu/mvsis/mvlogic.html; pp. 1-5.

* cited by examiner

*Primary Examiner* — Nghia M Doan
(74) *Attorney, Agent, or Firm* — LeRoy D. Maunu; Lois D. Cartier

(57) ABSTRACT

An implementation of a logic description is improved. The implementation has two signals coupled to two inputs of a fanout-free cone. A swap function is determined of the inputs of the fanout-free cone. The swap function indicates whether there is a difference at an output of the fanout free cone between the fanout-free cone with and without swapping the two signals between the two inputs of the fanout-free cone. A do-not-care function of the inputs of the fanout-free cone is determined for the logic description. The do-not-care function indicates that a modification of the output of the fanout-free cone is not observable at the primary outputs of the logic description. A modified implementation of the logic description is output in response to the do-not-care function covering the swap function. The modified implementation of the logic description has the two signals swapped between the two inputs of the fanout-free cone.

19 Claims, 6 Drawing Sheets

United States Patent US 7,904,842 B1

MODIFYING A LOGIC IMPLEMENTATION BY SWAPPING INPUTS OF FANOUT-FREE CONES

FIELD OF THE INVENTION

The present invention generally relates to modifying a logic implementation, and more particularly to improving timing of a logic implementation.

BACKGROUND

Synthesis of logic designs has become an important design challenge in modern integrated circuit (IC) devices, such as programmable logic devices (PLDs) and standard cell application specific integrated circuits (ASICs).

PLDs exist as a well-known type of IC that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An example FPGA includes an array of configurable logic blocks (CLBs) surrounded by a ring of programmable input/output blocks (IOBs). CLBs contain look-up tables (LUTs) which are small memories with K inputs capable of implementing any logic function having K variables. The CLBs and IOBs are interconnected by a programmable interconnect structure (routing resources). The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells then determine the function of the FPGA.

A conventional design process for an integrated circuit, such as an ASIC or an FPGA, begins with the creation of the logic design. The design specifies the function of a circuit at a schematic or logic level and may be represented using various programmable languages (e.g., VHDL, ABEL, or Verilog) or schematic capture programs. The design is synthesized to produce a logical network list ("netlist") supported by the target integrated circuit device. The synthesized design is mapped onto primitive components within the target device (e.g., programmable logic blocks of an FPGA). Placement of the components of the synthesized and mapped design is then performed for the target device. Interconnects (e.g., signal conductors) are routed within the target device for the placed components.

Performance and frequency requirements translate to a maximum allowable delay for paths through circuit elements and routing resources. Circuit area requirements limit the number and size of the primitive components. Thus, a logic design is often synthesized to achieve both timing and area constraints. However, improving timing performance often requires increased circuit area. For example, a signal that transitions slowly between logic levels can be improved by inserting an extra buffer for the signal, but the extra buffer adds to the circuit area.

Accordingly, there exists a need in the art for an integrated circuit design process that addresses these and other problems including methods for improving the timing performance of the design without increasing circuit area.

SUMMARY

Various embodiments of the invention provide a method for modifying an implementation of a logic description that has two signals coupled to two inputs of a fanout-free cone. A swap function is determined of the inputs of the fanout-free cone. The swap function indicates whether there is a difference at an output of the fanout free cone between the fanout-free cone with the two signals coupled to the two inputs and the fanout-free cone with the two signals swapped between the two inputs. A do-not-care function of the inputs of the fanout-free cone is determined for the logic description. The do-not-care function indicates that a modification of the output of the fanout-free cone is not observable at the primary outputs of the logic description. A modified implementation of the logic description is output in response to the do-not-care function covering the swap function. The modified implementation of the logic description has the two signals swapped between the two inputs of the fanout-free cone.

Various other embodiments of the invention provide a method for improving an implementation of a logic description. A critical timing path is determined for a timing metric for the implementation of the logic description. A fanout-free cone is determined that converges at each signal along the critical timing path. A swap function is determined for each pair of signals coupled in the implementation to two inputs of the fanout-free cone converging at each signal along the critical timing path. The swap function indicates whether there is a difference at the signal for the pair of signals coupled with and without swapping the two inputs. A do-not-care function is determined for the fanout-free cone converging at each signal along the critical timing path. The do-not-care function indicates that a modification of the signal is not observable at the primary outputs of the logic description. Each pair of signals is swapped between the two inputs when the timing metric is improved and the do-not-care function covers the swap function for each pair of signals coupled in the implementation to the two inputs of the fanout-free cone converging at each signal along the critical timing path. The implementation of the logic description is output.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
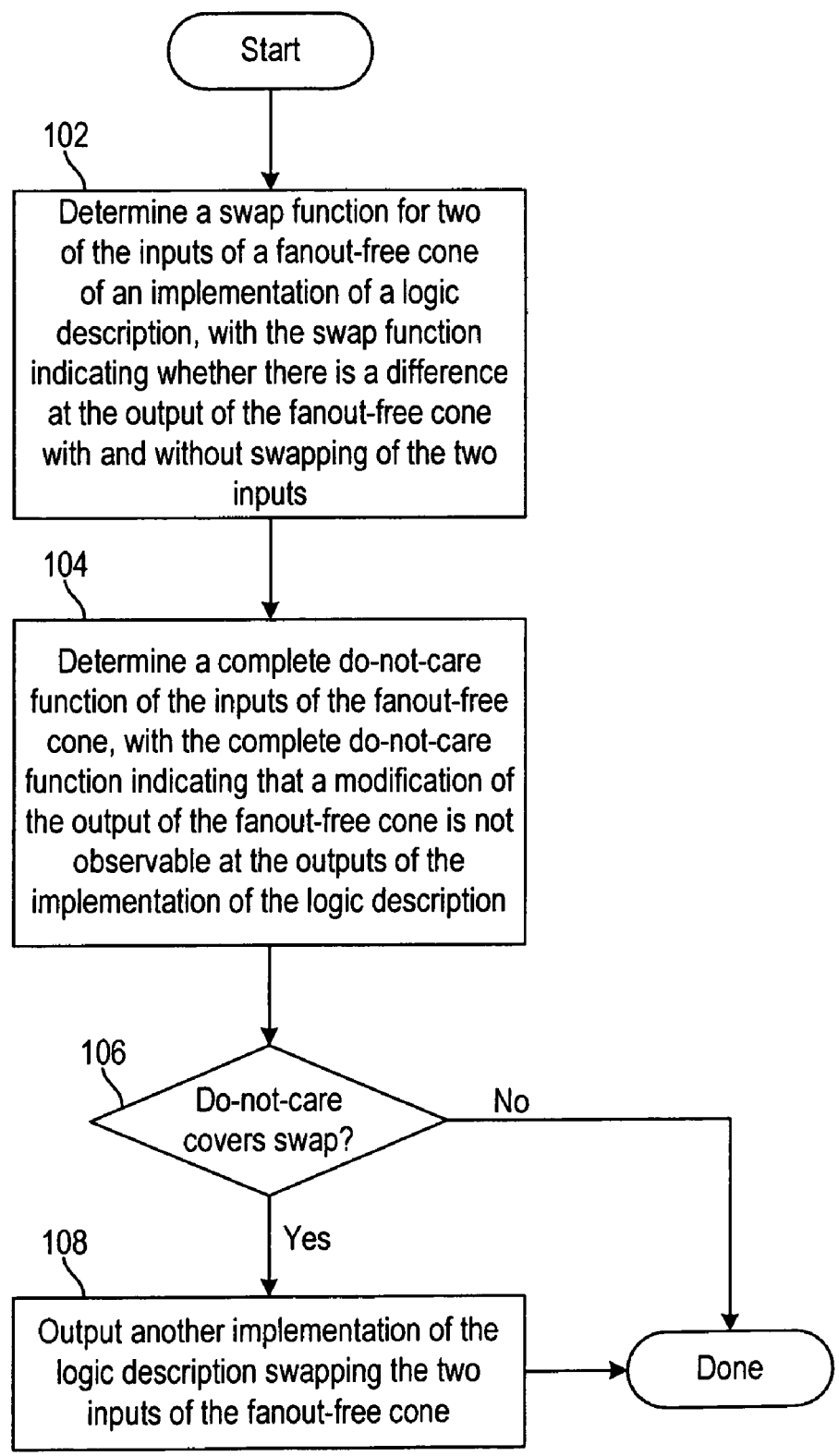
FIG. 1 is a flow diagram of a process for modifying an implementation of a logic description in accordance with various embodiments of the invention.

FIG. 1 is a flow diagram of a process for modifying an implementation of a logic description in accordance with various embodiments of the invention. The implementation of the logic description is modified, for example, to improve the circuit timing of the implementation.

At step 102, a swap function is determined for two inputs of a fanout-free cone within the implementation of the logic description. The swap function indicates whether the output of the fanout-free cone changes upon swapping these two inputs of the fanout-free cone.

At step 104, a do-not-care function is determined for the fanout-free cone. The do-not-care function indicates that a modification of the output of the fanout-free cone is not observable at the outputs of the logic description.

Decision 106 checks whether the do-not-care function covers the swap function. If the do-not-care function covers the swap function, the two inputs of the fanout-free cone are symmetrical. In one example, the do-not-care function covers the swap function if every minterm of the swap function is also a minterm of the do-not-care function. In another example, the do-not-care function covers the swap function if an AND function of the swap function and an inverse of the do-not-care function generates a null result.

If the do-not-care function covers the swap function, the two inputs of the fanout-free cone are swapped and a modified implementation of the logic description is output at step 108.

Figure 2:
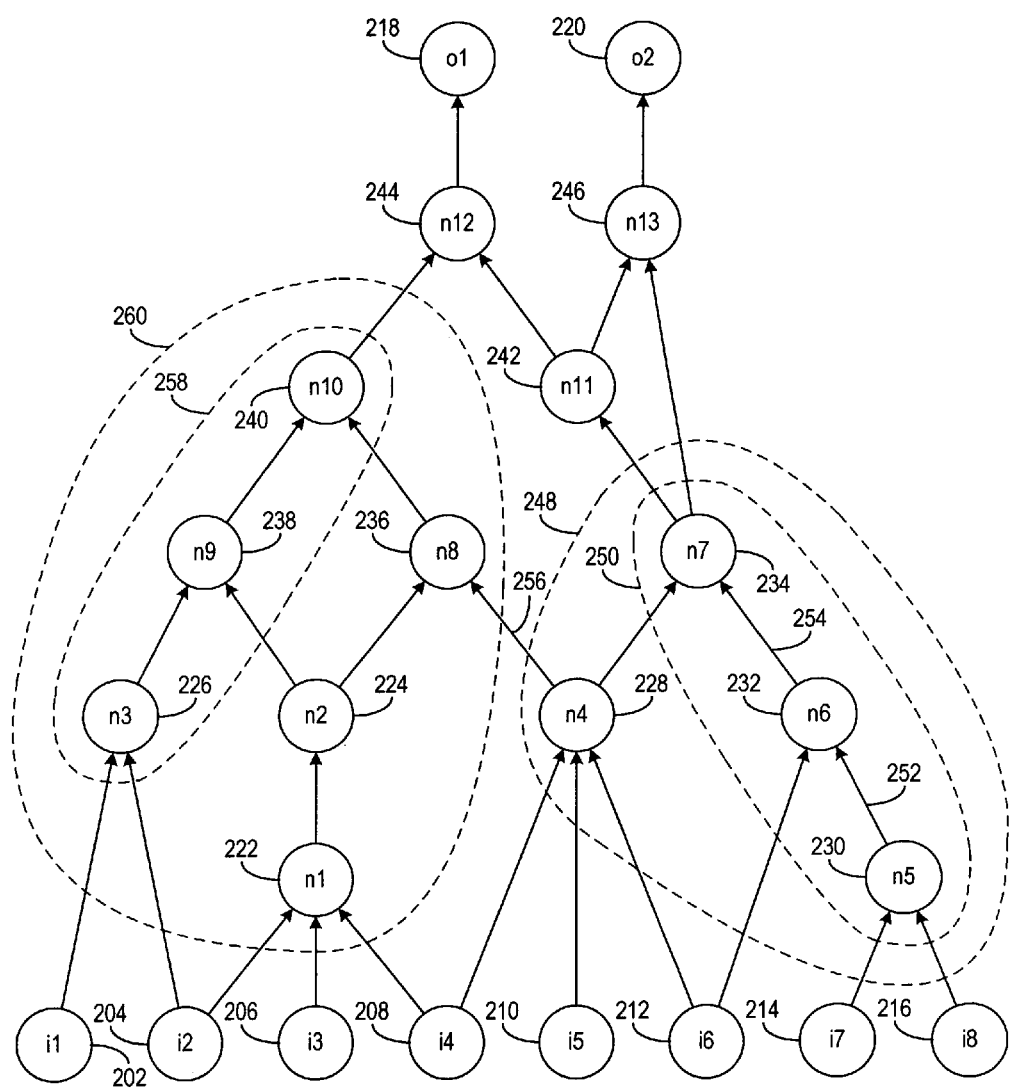
FIG. 2 is a graph of an example logic description illustrating fanout-free cones in accordance with various embodiments of the invention.

FIG. 2 is a graph of an example logic description illustrating fanout-free cones in accordance with various embodiments of the invention. The example logic description includes nodes 202 through 216 for the primary inputs of the example logic description and nodes 218 and 220 for the primary outputs of the example logic description. Nodes 222 through 246 correspond to logic elements of the implementation of the logic description. The directed edges between nodes 202 through 246 correspond to the signals connecting the logic elements.

An example cone 248 terminating at circuit element node 234 includes the circuit element nodes 228, 230, 232, and 234. This example cone terminates at the root node 234. Generally, a cone terminating at a root node can include each node having a directed edge originating at the node and terminating at the root node or another node in the cone.

Another example cone terminating at circuit element node 234 is an example fanout-free cone 250 converging at root node 234. Example fanout-free cone 250 includes nodes 230, 232, and 234, and directed edges 252 and 254. The directed edges 252 and 254 of example fanout-free cone 250 are all of the directed edges that originate at the fanout-free cone 250 nodes 230 and 232 excluding the root node 234. Every directed edge 252 and 254 of fanout-free cone 250 terminates at one of the nodes 230, 232, or 234 of the fanout-free cone 250. Generally, every directed edge originating at a node of a fanout-free cone other than the root node is a directed edge terminating at another node inside the fanout-free cone. The root node of a fanout-free cone is the only node of the fanout-free cone having a directed edge terminating outside the fanout-free cone. Thus, the cone 248 including only nodes 228, 230, 232, and 234 cannot be a fanout-free cone because directed edge 256 originates at non-root node 228 and terminates at node 236 outside of cone 248.

Two fanout-free cone free cones 258 and 260 are shown that converge at node 240. Fanout-free cones 258 and 260 are each subsets of the logic cone of all nodes reachable from node 240 by backwards traversal of the directed edges. Node 240 is the only node in fanout-free cones 258 and 260 having a directed edge that is directed to a node 244 outside the subset. In one embodiment, the nodes 202 through 216 for the primary inputs are not included in any fanout-free cone, and fanout-free cone 260 is the unique maximal fanout-free cone that converges at node 240.

Figure 3:
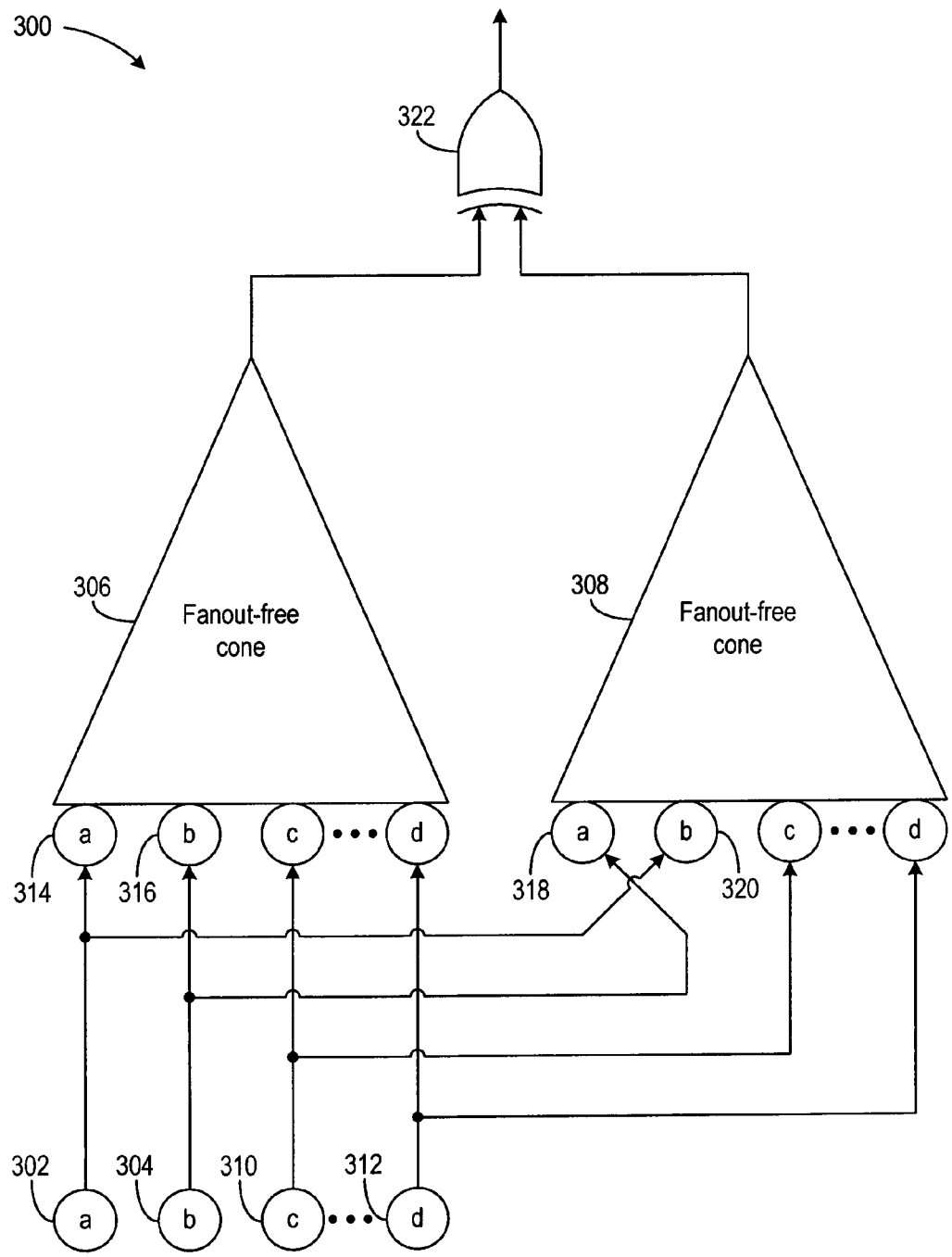
FIG. 3 is a block diagram of a miter of a swap function in accordance with various embodiments of the invention.

FIG. 3 is a block diagram of a miter 300 of a swap function in accordance with various embodiments of the invention. In one embodiment, the miter 300 helps determine whether two inputs 302 and 304 of a fanout-free cone can be swapped without changing the overall function of a logic description. Because a fanout-free cone only has fanouts from the output of the fanout-free cone, any change in the overall function of the logic description should be caused by the change in the output of the fanout-free cone.

Swap miter 300 includes two copies 306 and 308 of a fanout-free cone from the logic description. The inputs 302, 304, 310 and 312 from the logic description are connected to the inputs of the copies 306 and 308 of the fanout-free cone. Inputs 310 and 312 are connected to the corresponding inputs of both copies 306 and 308. While inputs 302 and 304 are respectively connected to the corresponding inputs 314 and 316 of fanout-free cone 306, in contrast, inputs 302 and 304 are respectively connected to swapped inputs 320 and 318 of fanout-free cone 308. It will be appreciated that additional miters can be constructed for swapping other pairs of the inputs 302, 304, 310, and 312.

Exclusive-OR 322 outputs an asserted value for a particular combination of values of the inputs 302, 304, 310, and 312 if the swapping of inputs 302 and 304 of the fanout-free cone in the original logic design would modify the output of the fanout-free cone in the original logic design.

Frequently, a primary output of the logic design would change if the fanout-free cone receives a combination of values of the inputs 302, 304, 310, and 312 that changes the output of the fanout-free cone, because the change of the output of the fanout-free cone would propagate to one or more of the primary outputs. However, a primary output might not change if the change in the output of the fanout-free cone is blocked from propagating to any primary output by logic after the fanout-free cone. In addition, logic before the fanout-free cone might prohibit receiving a particular combination of values of the inputs 302, 304, 310, and 312 for which the swapping of inputs 302 and 304 causes a change in the output of the fanout-free cone. For example, logic before the fanout-free cone could force inputs 302 and 304 to be complements of each other, such that the fanout-free cone cannot receive combinations having the same value for inputs 302 and 304.

It will be appreciated that miter 300 defines a swap function, but miter 300 does not need to be explicitly created to determine a swap function. In one embodiment, the fanout-free cone is evaluated for all combinations of values of the inputs 302, 304, 310, and 312 of the fanout-free cone, and the results of this evaluation are used to create a swap function for swapping any pair of the inputs 302, 304, 310, and 312. The swap function is a Karnaugh map or other definition of the values of the inputs 302, 304, 310, and 312 for which the swapping changes the value output by the fanout-free cone.

Figure 4:
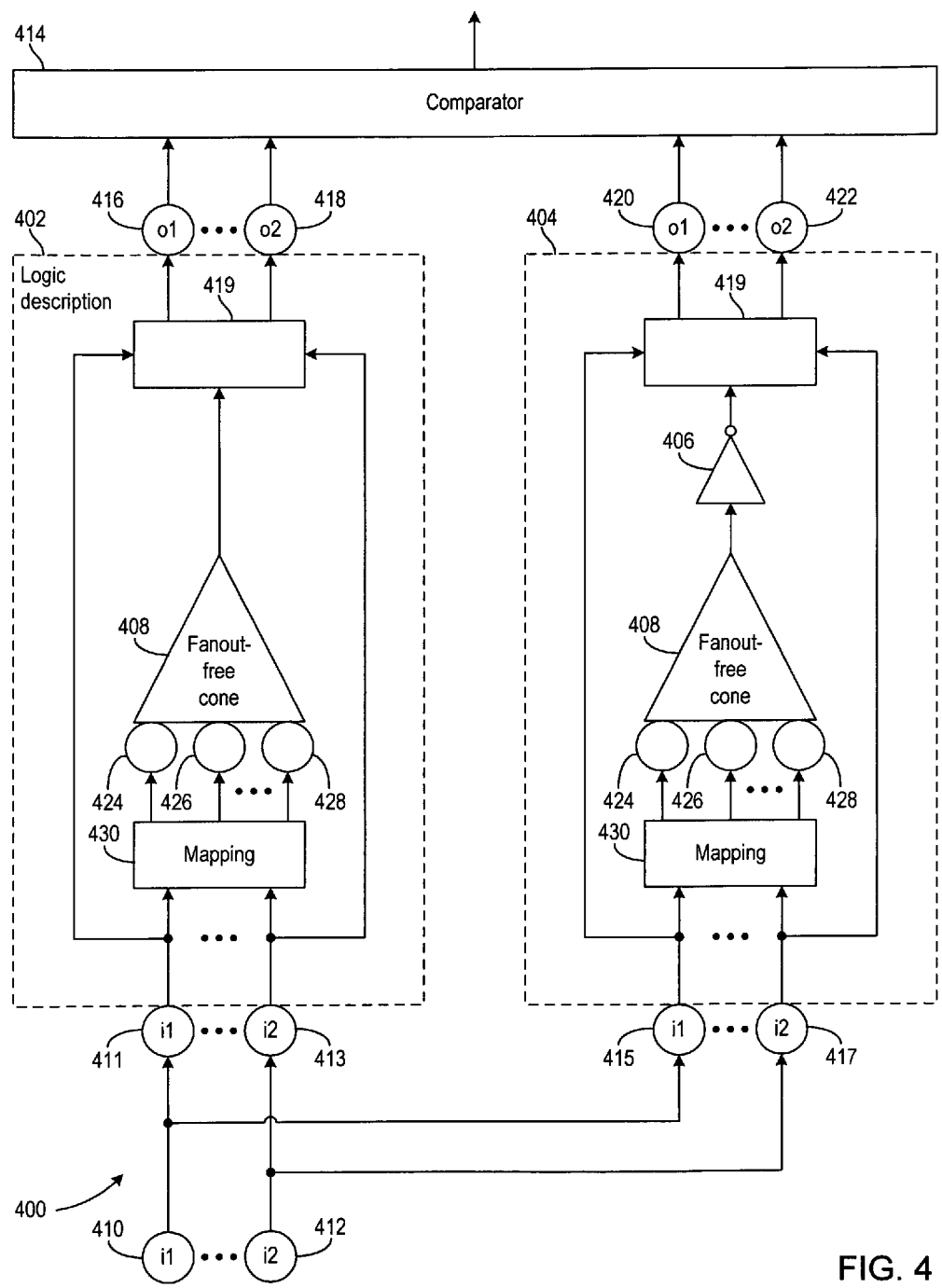
FIG. 4 is a block diagram of a miter for a complete do-not-care function in accordance with various embodiments of the invention.

FIG. 4 is a block diagram of a miter 400 for a complete do-not-care function in accordance with various embodiments of the invention. In one embodiment, the miter 400 helps determine whether a primary output changes after inverting the value output from a fanout-free cone. The output value of the fanout-free cone changes in certain embodiments of the invention, because two inputs of the fanout-free cone are swapped, for example, to improve the timing characteristics of the logic description.

Complete do-not-care miter 400 includes two copies 402 and 404 of the logic description, with copy 404 modified to include an inverter 406 following fanout-free cone 408. The primary inputs 410 through 412 of the logic description are coupled to inputs 411 through 413 of copy 402 of the logic description, and the primary inputs 410 through 412 are also coupled, with swapping, to the inputs 415 through 417 of copy 404 of the logic description. Comparator 414 compares the primary outputs 416 through 418 from logic block 419 of copy 402 of the logic description with the primary outputs 420 through 422 of modified copy 404 of the logic description.

In one embodiment, miter 400 is evaluated for all combinations of values of the inputs 410 through 412. The "care set" for fanout-free cone 408 corresponds to all combination of values of the inputs 424, 426, and 428 of fanout-free cone for which the comparator 414 finds a difference during the evaluation of all combinations of values of the inputs 410 through 412. The complete do-not-care function of fanout-free cone 408 is the combination of values of the inputs 424, 426, and 428 of fanout-free cone 408 that are not included in the "care set." The complete do-not-care function of fanout-free cone 408 includes combinations of values of the inputs 424, 426, and 428 that cannot occur because mapping block 430 does not generate these combinations of values of the inputs 424, 426, and 428 for any combination of values of the primary inputs 410 through 412.

It will be appreciated that miter 400 defines a complete do-not-care function, but miter 400 does not need to be explicitly created to determine a complete do-not-care function. In addition, a do-not-care function can be a subset of the complete do-not-care function defined by miter 400. In one example, a do-not-care function for fanout-free cone 408 is calculated as the complete do-not-care function for a subblock of the logic description that includes the fanout-free cone 408. Because the entire logic description is not considered in generating this do-not-care function, this do-not-care function is generated more quickly but might include fewer combinations of the inputs of the fanout-free cone 408 than the complete do-not-care function. However, if the block includes most or all of the reconvergent fanout associated with the fanout-free cone 408, this do-not-care function could be identical to the complete do-not-care function of the fanout-free cone 408.

Figure 5:
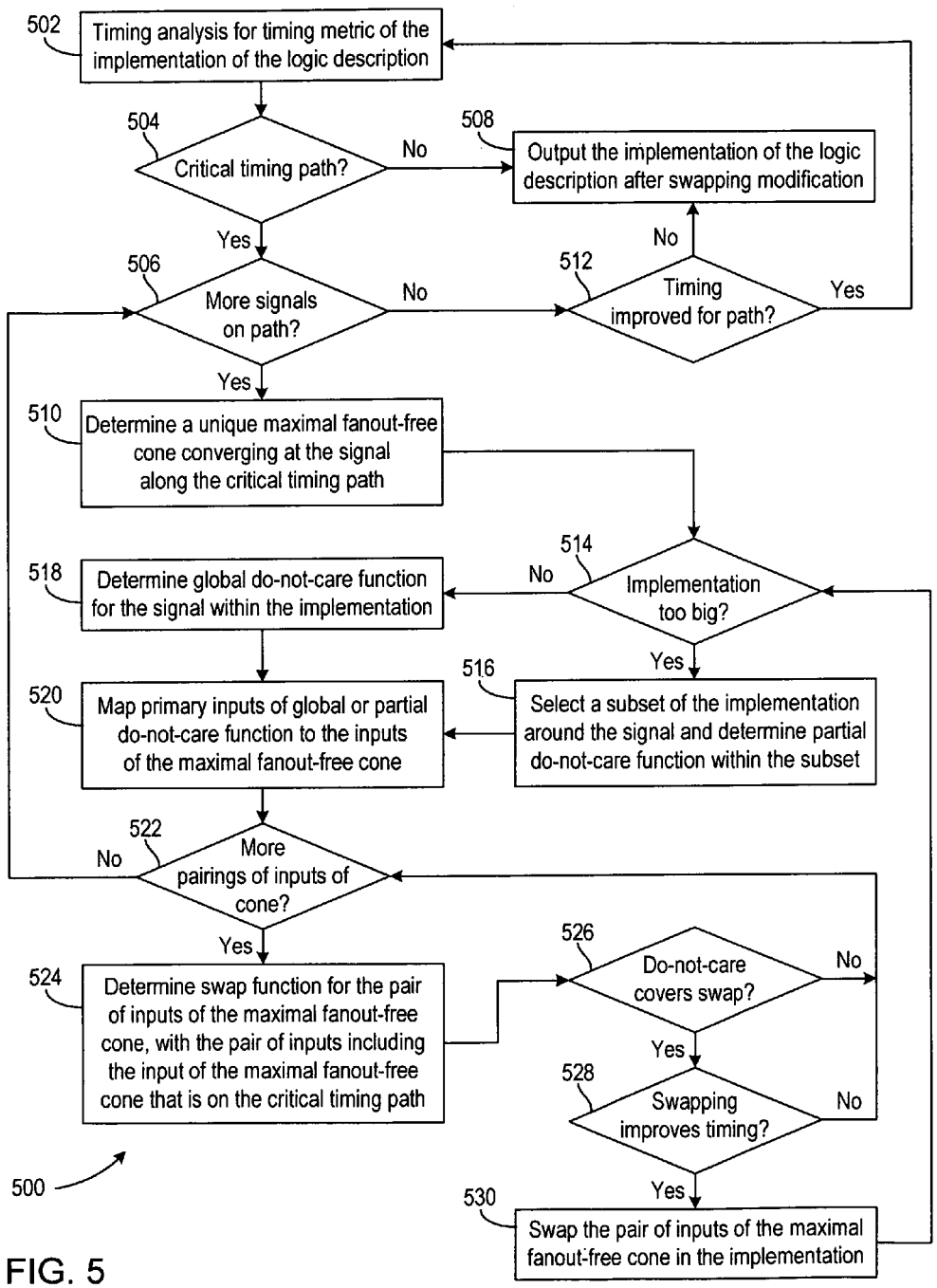
FIG. 5 is a flow diagram of a process for improving an implementation of a logic description in accordance with various embodiments of the invention.

FIG. 5 is a flow diagram of a process 500 for improving an implementation of a logic description in accordance with various embodiments of the invention. Inputs of fanout-free cones are swapped when the swapping improves timing and does not modify the overall function of the logic design.

At step 502, a timing analysis determines the critical timing paths of the implementation of the logic design for a timing metric of path propagation delay, for example. Decision 504 checks whether a critical timing path is found by the timing analysis. If the implementation of the logic design includes a critical timing path not meeting timing requirements, process 500 proceeds to decision 506. Otherwise, the implementation meets timing requirements and process 500 proceeds to step 508 to output the implementation of the logic design.

Decision 506 checks whether there are more signals along the critical timing path that are candidates for modification to improve timing. If there are additional candidate signals, then process 500 proceeds to step 510. Otherwise, if all signals of the critical timing path have been considered for timing improvements, then process 500 proceeds to decision 512.

Decision 512 checks whether one or more modifications have improved the critical timing path. If the critical timing path is improved, then process 500 returns to step 502 to perform another timing analysis to determine the current critical timing path. This timing analysis could be an incremental timing analysis, or a new timing analysis. If the critical timing path is not improved, then timing of the path was not improved, and process 500 proceeds to step 508 to output the possibly modified implementation that still does not meet the timing requirements.

At step 510, the unique maximal fanout-free cone is determined that converges at the signal along the critical timing path. Decision 514 checks whether the implementation is too big to exhaustively evaluate the implementation for all values of the primary inputs. If the implementation is too big, process 500 proceeds to step 516; otherwise, process 500 proceeds to step 518.

At step 518, a global do-not-care function is determined for the signal as a function of the primary inputs of the logic description. The global do-not-care function provides the combinations of values of the primary inputs for which the output of the fanout-free cone is irrelevant for determining the values of the primary outputs of the logic description.

At step 516, a subset of the implementation around the signal is selected. In one embodiment, the subset is selected as a window of a manageable size around the fanout-free cone. A partial do-not-care function is determined for the signal as a function of the inputs of the window within the logic description. The partial do-not-care function provides the combinations of value of the inputs of the window for which the output of the fanout-free cone is irrelevant for determining the values of the outputs of the window.

At step 520, the primary inputs of the global or partial do-not-care function are mapped to the inputs of the fanout-free cone. This provides combinations of values of the inputs of the fanout-free cone for which the output of the fanout-free cone is irrelevant for determining the values of the primary outputs of the logic description.

Decision 522 checks whether there are more pairings of the inputs of the fanout-free cone to consider. The critical timing path should enter the fanout-free cone from a particular input of the fanout-free cone and exit the fanout-free cone at the signal used at step 510 to create the fanout-free cone. If there are more pairings of inputs that include this critical input of the fanout-free cone, process 500 proceeds to step 524; otherwise, process 500 returns to decision 506 to check the next signal along the critical timing path.

At step 524, a swap function is determined for the pair of inputs of the maximal fanout-free cone. The swap function provides the combinations of inputs of the fanout-free cone for which the output signal of the fanout-free cone is changed by swapping the two inputs.

Decision 526 checks whether the do-not-care function covers the swap function. If the do-not-care function covers the swap function, then the overall function of the logic design is not changed by swapping the two inputs, and process 500 proceeds to decision 528. Otherwise, process 500 returns to decision 522 to check for more pairings of inputs to swap.

Decision 528 checks whether the critical timing path and the overall timing of the logic description are improved by swapping the pair of inputs of the maximal fanout-free cone. If timing is improved, process 500 proceeds to step 530; otherwise, process 500 returns to decision 522 to check for more pairings of inputs to swap. At step 530, the pair of inputs of the maximal fanout-free cone are swapped to improve timing without changing the overall function of the logic description. Because the changes to the logic description are localized at the inputs of the fanout-free cone, perturbing of the logic description is also localized at the inputs of the fanout-free cone.

Figure 6:
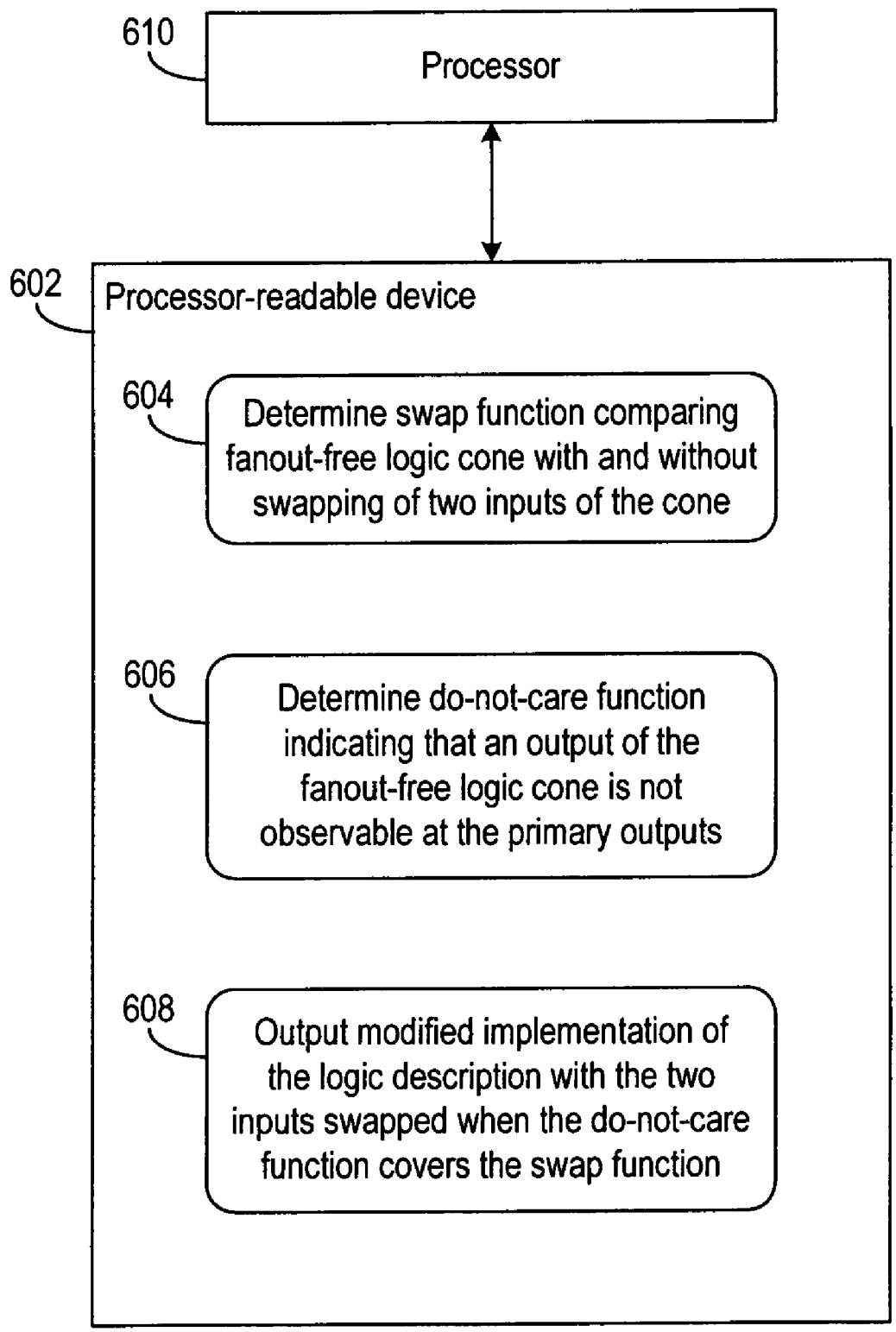
FIG. 6 is a block diagram of a system for modifying an implementation of a logic description in accordance with various embodiments of the invention.

FIG. 6 is a block diagram of a system for modifying an implementation of a logic description, in accordance with various embodiments of the invention. A processor-readable device 602 is configured with software modules 604, 606, and 608 for modifying an implementation of a logic description. The logic description has two signals coupled to two inputs of a fanout-free cone that converges at an output of the fanout-free cone.

Execution of the instructions in software module 604 causes processor 610 to determine a swap function comparing the output of the fanout-free cone with and without swapping of the two inputs. Execution of the instructions in software module 606 causes processor 610 to determine a do-not-care function indicating that the output of the fanout-free cone is unobservable at the primary outputs of the logic description.

Execution of the instructions of software module 608 causes processor 610 to output a modified implementation of the logic description that swaps the two inputs of the fanout-free cone if the do-not-care function covers the swap function.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable media or delivery channels such as magnetic or optical disks or tapes, electronic storage devices, or as application services over a network.

The present invention is thought to be applicable to a variety of systems for modifying an implementation of a logic description. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method for modifying a first implementation of a logic description that has first and second signals respectively coupled to first and second inputs of a plurality of inputs of a fanout-free cone that converges at an output, the first implementation of the logic description having a plurality of primary inputs and a plurality of primary outputs, the processor-implemented method comprising:

in at least one programmed processor, performing steps including:

for the fanout-free cone, determining a swap function of the inputs of the fanout-free cone, the swap function indicating whether there is a difference at the output of the fanout-free cone between the fanout-free cone with the first and second signals respectively coupled to the first and second inputs and the fanout-free cone with the first and second signals respectively coupled to the second and first inputs;

for the logic description, determining a do-not-care function of the inputs of the fanout-free cone, the do-not-care function indicating that a modification of the output of the fanout-free cone is not observable at the primary outputs of the logic description, wherein the do-not-care function is a complete do-not-care function; and outputting, in response to the do-not-care function covering the swap function, a second implementation of the logic description that has the first and second signals respectively coupled to the second and first inputs of the fanout-free cone.

2. The processor-implemented method of claim 1, further comprising:

determining a critical timing path for a timing metric between the primary inputs and the primary outputs of an implementation of the logic description;

for each of a plurality of signals along the critical timing path, determining a fanout-free cone converging at the signal along the critical timing path;

wherein the determining of the swap function includes, for each pair of signals coupled in the implementation to two of a plurality of inputs of the fanout-free cone converging at each signal along the critical timing path, determining a respective swap function of the inputs of the fanout-free cone, the respective swap function indicating whether there is a difference at the signal between a first coupling of the pair of signals to the two inputs and a second coupling of the pair of signals to the two inputs that is swapped relative to the first coupling;

wherein the determining of the do-not-care function includes, for the fanout-free cone converging at each signal along the critical timing path, determining a respective do-not-care function of the inputs of the fanout-free cone, the respective do-not-care function indicating that a modification of the signal is not observable at the primary outputs of the logic description; and the outputting includes, for each pair of signals coupled in the implementation to the two inputs of the fanout-free cone converging at each signal along the critical timing path, swapping the pair of signals between the two inputs within the implementation in response to the timing metric being improved by the swapping and the respective do-not-care function for the fanout-free cone covering the respective swap function for the pair of signals of the fanout-free cone.

3. The processor-implemented method of claim 1, wherein the fanout-free cone is a unique maximal fanout-free cone that converges at the output of the fanout-free cone.

4. The processor-implemented method of claim 1, wherein the first implementation is a directed acyclic graph having nodes for logic elements and directed edges for signals from both the primary inputs and outputs of the logic elements to both the primary outputs and inputs of the logic elements, and a generic logic cone terminating at the output of the fanout-free cone includes the nodes that are reachable from a node for the logic element having the output by a backwards traversal of the directed edges, and the fanout-free cone converging at the output is a subset of the generic logic cone with the node being the only node in the subset having a directed edge that is directed to a node outside the subset.

5. The processor-implemented method of claim 1, wherein the determining of the swap function for the fanout-free cone includes generating a miter including a first copy of the fanout-free cone with the first and second signals respectively coupled to the first and second inputs, a second copy of the fanout-free cone with the first and second signals respectively coupled to the second and first inputs, and an exclusive-OR of the outputs of the copies of the fanout-free cone.

6. The processor-implemented method of claim 1, wherein the determining of the swap function for the fanout-free cone includes evaluating a miter of the swap function for a plurality of combinations of values for the inputs of the fanout-free cone until the swap function is not covered by the do-not-care function for one of the combinations of values for the inputs.

7. The processor-implemented method of claim 1, wherein the determining of the do-not-care function includes determining a global do-not-care function of the primary inputs of the logic description with the global do-not-care function indicating that a modification of the output of the fanout-free cone is not observable at the primary outputs of the logic description, and mapping the primary inputs of the global do-not-care function to the inputs of the fanout-free cone.

8. The processor-implemented method of claim 1, wherein the determining of the do-not-care function for the fanout-free cone includes generating a miter including a first copy of the logic description, a second copy of the logic description with an inverter inserted at the output of the fanout-free cone, and a comparator of the primary outputs of the copies of the logic description.

9. The processor-implemented method of claim 1, wherein the determining of the do-not-care function for the fanout-free cone includes evaluating a miter of the do-not-care function for a plurality of combinations of values for the inputs of the fanout-free cone until the swap function is not covered by the do-not-care function for one of the combinations of values for the inputs.

10. The processor-implemented method of claim 1, wherein the difference is the modification that is not observable at the primary outputs of the logic description in response to the do-not-care function covering the swap function.

11. The processor-implemented method of claim 1, wherein the do-not-care function covering the swap function is generating a null result from an AND function of the swap function and an inverse of the do-not-care function.

12. The processor-implemented method of claim 1, further comprising determining the first and second signals are symmetrical in the first implementation of the logic description in response to the do-not-care function covering the swap function, wherein the outputting includes outputting the second implementation of the logic description in response to the first and second signals being symmetrical.

13. The processor-implemented method of claim 1, wherein the outputting of the second implementation of the logic description in response to the do-not-care function covering the swap function includes outputting the second implementation of the logic description in response to the do-not-care function covering the swap function and the second implementation improving a timing metric of the logic description relative to the first implementation.

14. A processor-implemented method for improving an implementation of a logic description, comprising:
    in at least one programmed processor, performing steps including:
        determining a critical timing path for a timing metric between a plurality of primary inputs and a plurality of primary outputs of the implementation of the logic description;
        for each of a plurality of signals along the critical timing path, determining a fanout-free cone converging at the signal along the critical timing path;
        for each pair of signals coupled in the implementation to two of a plurality of inputs of the fanout-free cone converging at each signal along the critical timing path, determining a respective swap function of the inputs of the fanout-free cone, the respective swap function indicating whether there is a difference at the signal between a first coupling of the pair of signals to the two inputs and a second coupling of the pair of signals to the two inputs that is swapped relative to the first coupling;
        for each fanout-free cone, determining a respective do-not-care function of the inputs of the fanout-free cone, the respective do-not-care function indicating that a modification of the signal is not observable at the primary outputs of the logic description wherein the do-not-care function is a complete do-not-care function;
        for each pair of signals coupled in the implementation to two inputs of the fanout-free cone converging at each signal along the critical timing path, swapping coupling of the pair of signals between the two inputs within the implementation in response to the timing metric being improved by the swapping and the respective do-not-care function for the fanout-free cone covering the respective swap function for the pair of signals of the fanout-free cone; and
        outputting the implementation of the logic description.

15. The processor-implemented method of claim 14, wherein the determining of the fanout-free cone for each signal along the critical timing path includes determining a unique maximal fanout-free cone for each signal along the critical timing path.

16. The processor-implemented method of claim 14, further comprising repeating, for each critical timing path of a sequence of additional critical timing paths for the timing metric of the implementation of the logic description, the determining of the critical timing path, the determining of the fanout-free cone, the determining of the respective swap function, the determining of the respective do-not-care function, and the swapping.

17. The processor-implemented method of claim 16, wherein the outputting of the implementation of the logic description includes outputting the implementation of the logic description after the timing metric is achieved.

18. The processor-implemented method of claim 16, wherein the outputting of the implementation of the logic description includes outputting the implementation of the logic description after the timing metric is no longer being improved by the swapping.

19. A non-transitory program storage medium, comprising:
    a processor-readable device configured with instructions for modifying a first implementation of a logic description that has a first and second signal respectively coupled to a first and second input of a plurality of inputs of a fanout-free cone converging at an output, wherein execution of the instructions by one or more processors causes the one or more processors to perform operations including,
    for the fanout-free cone, determining a swap function of the inputs of the fanout-free cone, the swap function indicating whether there is a difference at the output of the fanout-free cone between the fanout-free cone with the first and second signals respectively coupled to the first and second inputs and the fanout-free cone with the first and second signals respectively coupled to the second and first inputs;
    for the logic description, determining a do-not-care function of the inputs of the fanout-free cone, the do-not-care function indicating that a modification of the output of the fanout-free cone is not observable at a plurality of primary outputs of the logic description, wherein the do-not-care function is a complete do-not-care function; and
    outputting, in response to the do-not-care function covering the swap function, a second implementation of the logic description that has the first and second signals respectively coupled to the second and first inputs of the fanout-free cone.

* * * * *